(12) United States Patent
Hayter et al.

(10) Patent No.: US 7,660,931 B2
(45) Date of Patent: *Feb. 9, 2010

(54) SYSTEM ON A CHIP FOR NETWORKING

(75) Inventors: Mark D. Hayter, Menlo Park, CA (US); Joseph B. Rowlands, Santa Clara, CA (US); James Y. Cho, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/178,101

(22) Filed: Jul. 23, 2008

(65) Prior Publication Data

US 2008/0276018 A1 Nov. 6, 2008

Related U.S. Application Data

(63) Continuation of application No. 10/884,700, filed on Jul. 2, 2004, now Pat. No. 7,418,534, which is a continuation of application No. 09/861,191, filed on May 18, 2001, now Pat. No. 6,766,389.

(51) Int. Cl.
*G06F 13/00* (2006.01)
*G06F 3/00* (2006.01)

(52) U.S. Cl. .................. 710/305; 710/104; 710/306; 710/311

(58) Field of Classification Search ............... None
See application file for complete search history.

(56) References Cited

U.S. PATENT DOCUMENTS 6,981,087 B1 * 12/2005 Heitkamp et al. ......... 710/301

* cited by examiner

*Primary Examiner*—Tariq R. Hafiz
*Assistant Examiner*—Scott Sun
(74) *Attorney, Agent, or Firm*—Garlick Harrison & Markison

(57) ABSTRACT

A system on a chip for network devices. In one implementation, the system on a chip may include (integrated onto a single integrated circuit), a processor and one or more I/O devices for networking applications. For example, the I/O devices may include one or more network interface circuits for coupling to a network interface. In one embodiment, coherency may be enforced within the boundaries of the system on a chip but not enforced outside of the boundaries.

12 Claims, 7 Drawing Sheets

Carrier Medium
300

System 10

SYSTEM ON A CHIP FOR NETWORKING

CROSS REFERENCE TO RELATED APPLICATION

This application is a continuation of and claims priority to U.S. patent application Ser. No. 10/884,700, filed Jul. 2, 2004; which application is a continuation of and claims priority to U.S. patent application Ser. No. 09/861,191, filed May 18, 2001, now U.S. Pat. No. 6,766,389; in which both above listed applications are incorporated by reference herein.

BACKGROUND OF THE INVENTION

1. Field of the Invention

This invention is related to network devices and, more particularly, to integrated circuits used in network devices.

2. Description of the Related Art

Networking of computer systems and other electronic devices has become more and more prevalent, at all levels of the network. Computer systems in offices, and sometimes even homes, are networked in local area networks (LANs). Geographically distant computer systems can be network in wide area networks (WANs). The Internet can be considered an example of a WAN.

Various network devices may be involved in transmitting network data (communications between the networked systems) from one computer system to another. For example, firewalls are typically used between a local area network and a wider area network (e.g. the Internet) to protect the local area network from invasion from the wide area network. Routers receive network data (e.g. packets), analyze the data, and route the data on to another router or the receiving computer system. The routers may include circuitry to examine packets to provide such features as quality of service (QoS), caching of information, etc.

SUMMARY OF THE INVENTION

The present invention is directed to apparatus and methods of operation that are further described in the following Brief Description of the Drawings, the Detailed Description of the Embodiments of the Invention, and the Claims. Other features and advantages of the present invention will become apparent from the following detailed description of the embodiments of the invention made with reference to the accompanying drawings.

BRIEF DESCRIPTION OF THE DRAWINGS

The following detailed description makes reference to the accompanying drawings, which are now briefly described.

FIG. 8 is a block diagram of one embodiment of a carrier medium.

Figure 1:
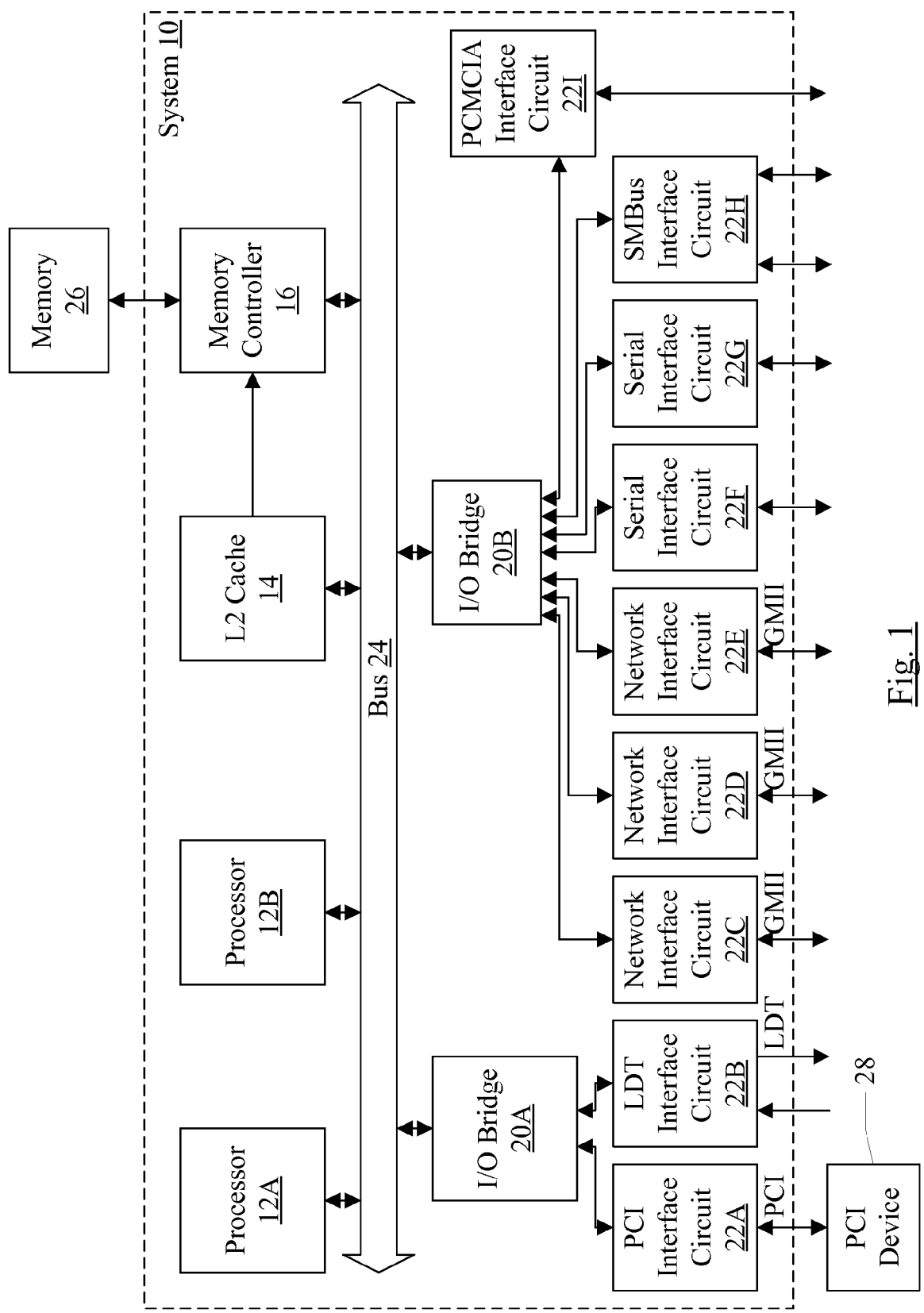
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS OF THE INVENTION

System Overview

Turning now to FIG. 1, a block diagram of one embodiment of a system 10 is shown. Other embodiments are possible and contemplated. In the embodiment of FIG. 1, the system 10 includes processors 12A-12B, an L2 cache 14, a memory controller 16, a pair of input/output (I/O) bridges 20A-20B, and various I/O interface circuits 22A-22I. The system 10 may include a bus 24 for interconnecting the various components of the system 10. As illustrated in FIG. 1, each of the processors 12A-12B, the L2 cache 14, the memory controller 16, and the I/O bridges 20A-20B are coupled to the bus 24. Thus, each of the processors 12A-12B, the L2 cache 14, the memory controller 16, and the I/O bridges 20A-20B may be an agent on the bus 24 for the illustrated embodiment. The I/O bridge 20A is coupled to the I/O interface circuits 22A-22B (specifically, in the illustrated embodiment, a Peripheral Component Interconnect (PCI) interface circuit 22A and a Lightning Data Transport (LDT) interface circuit 22B, where the LDT interface is now also being referred to as the Hyper-Transport interface), and the I/O bridge 20B is coupled to the I/O interface circuits 22C-22I (specifically, in the illustrated embodiment, three network interface circuits 22C-22E, two serial interface circuits 22F-22G, a system management bus (SMBus) Interface circuit 22H, and a Personal Computer Memory Card International Association (PCMCIA) Interface circuit 22I). The L2 cache 14 is coupled to the memory controller 16, which is further coupled to a memory 26. Also illustrated in FIG. 1 is a PCI device 28 coupled to the PCI bus from the PCI interface circuit 22A.

The processors 12A-12B may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. In one implementation, the processors 12A-12B may implement a general purpose instruction set (and instruction set useful for general purpose computing). Specifically, the implementation may include no additional instructions optimized for network applications (routers, switches, firewalls, etc.). While the system 10 as shown in FIG. 1 includes two processors, other embodiments may include one processor or more than two processors, as desired.

The L2 cache 14 is a high speed cache memory. The L2 cache 14 is referred to as "L2" since the processors 12A-12B may employ internal level 1 ("L1") caches. If L1 caches are not included in the processors 12A-12B, the L2 cache 14 may be an L1 cache. Furthermore, if multiple levels of caching are included in the processors 12A-12B, the L2 cache 14 may be an outer level cache than L2.

While the L2 cache 14 is labeled L2 with respect to it position in the processor cache hierarchy, the L2 cache 14 may actually service cacheable transactions from any device on the bus 24. Thus, the L2 cache 14 may be viewed as part of a memory subsystem including the memory controller 16 (and the memory 26 coupled thereto). If a cacheable read transaction hits in the L2 cache 14, even if the source of the read transaction is an I/O interface circuit 22A-22I, the L2 cache 14 supplies the data for the read transaction. If a cacheable write transaction hits in the L2 cache 14, even if the source of the read transaction is an I/O interface circuit 22A-22I, the L2 cache 14 updates with the data for the read transaction.

The L2 cache 14 may employ any organization, including direct mapped, set associative, and fully associative organizations. In one particular implementation, the L2 cache 14 may be a set associative cache (in general N way, N being an integer, although a specific 4 way embodiments is illustrated below) having 32 byte cache blocks. A set associative cache is a cache arranged into multiple sets, each set comprising two or more entries. A portion of the address (the "index") is used to select one of the sets (i.e. each encoding of the index selects a different set). The cache block storage locations in the selected set are eligible to store the cache block accessed by the address. Each of the cache block storage locations within the set is referred to as a "way" of the set. The portion of the address remaining after removing the index (and the offset within the cache block) is referred to as the "tag", and is stored in each cache block storage location to identify the cache block in that entry. The stored tags are compared to the corresponding tag portion of the address of a memory transaction to determine if the memory transaction hits or misses in the cache, and is used to select the way in which the hit is detected (if a hit is detected).

The memory controller 16 is configured to access the memory 26 in response to memory transactions received on bus 24. The memory controller 16 receives a hit signal from the L2 cache 14, and if a hit is detected in the L2 cache 14 for a memory transaction, memory controller 16 does not respond to that memory transaction. Other embodiments may not include the L2 cache 14 and the memory controller 16 may respond to each memory transaction. If a miss is detected by the L2 cache 14, or the memory transaction is non-cacheable, the memory controller 16 may access the memory 26 to perform the read or write operation. The memory controller 16 may be designed to access any of a variety of types of memory. For example, the memory controller 16 may be designed for synchronous dynamic random access memory (SDRAM), and more particularly double data rate (DDR) SDRAM. Alternatively, the memory controller 16 may be designed for DRAM, Rambus DRAM (RDRAM), SRAM, or any other suitable memory device.

The I/O bridges 20A-20B link one or more I/O interface circuits (e.g. the I/O interface circuits 22A-22B for the I/O bridge 20A and the I/O interface circuits 22C-22I for I/O bridge 20B) to the bus 24. While I/O interface circuits are shown in FIG. 1, generally an I/O bridge 20A-20B may link one or more I/O interface circuits or I/O devices. The I/O bridges 20A-20B may serve to reduce the electrical loading on the bus 24 if more than one I/O interface circuit 22A-22I is bridged by that I/O bridge. Generally, the I/O bridge 20A performs transactions on the bus 24 on behalf of the I/O interface circuits 22A-22B and relays transactions targeted at the I/O interface circuit 22A-22B from the bus 24 to that I/O interface circuit 22A-22B. Similarly, the I/O bridge 20B generally performs transactions on the bus 24 on behalf of the I/O interface circuits 22C-22I and relays transactions targeted at an I/O interface circuit 22C-22I from the bus 24 to that I/O interface circuit 22C-22I.

The PCI interface circuit 22A may be a circuit for interfacing to the PCI bus. In one embodiment, the PCI interface circuit 22A may the 66 MHz PCI specification version 2.2. The PCI interface circuit 22A may be configurable to be the host bridge on the PCI bus.

The PCI device 28 shown coupled to the PCI bus may be illustrative of any device capable of communicating on the PCI bus. Any type of peripheral component (e.g. modems, network interface devices, video accelerators, audio cards, hard or floppy disk drives or drive controllers, SCSI (Small Computer Systems Interface) adapters and telephony cards, etc.

The LDT interface circuit 22B may be a circuit for interfacing to the LDT fabric. As mentioned above, the LDT interface is now also being referred to as the HyperTransport interface, developed by Advanced Micro Devices, Inc. The interface will be referred to herein as LDT, but is intended to refer to the HyperTransport interface as well. The LDT interface circuit 22B may be the host bridge on the LDT fabric. Generally, the LDT interface is a point to point, packet based interface.

The network interface circuits 22C-22E may each include Ethernet Media Access Controllers (MACs), in one embodiment. Thus, the network interface circuits 22C-22E may interface externally to the Media Independent Interface (MII) or the Gigabit MII (GMII) interface. Alternatively, the external interface may be a generic packet interface in which either the start or end of packets is flagged using control signals on the interface. In yet another alternative, the three network interface circuits 22C-22E may be operable as two wider packet interfaces (e.g. 16 bit interfaces, if the individual MII/GMII interfaces are 8 bits). The network interface circuits 22C-22E may be configurable (e.g. during reset) to operate the interface in any of the above modes. The network interface circuits 22C-22E may alternatively include the physical portion of the Ethernet interface and interface directly to an Ethernet physical medium (e.g. twisted pair, fiber optic, etc.). Still further, other embodiments may support any network interface (e.g. X.25, Frame Relay, Asynchronous Transfer Mode (ATM), Token Ring, etc.). Generally, a network interface circuit is a circuit for interfacing to any network interface. A network interface is an interface designed for networking multiple computer systems.

The serial interface circuits 22F-22G may support dual serial interfaces. The serial interfaces may be operated synchronously, and may also include a dual universal asynchronous receiver/transmitter (DUART) for dual asynchronous operation. The SMBus Interface circuit 22H supports the SMBus interface, and the PCMCIA interface circuit 22I supports the PCMCIA interface. Additionally, a generic bus and general purpose I/O may be supported (not shown).

While a specific set of I/O interface circuits 22A-22I are shown, other embodiments may use any subsets or supersets of the set shown. Furthermore, other embodiments may include any set of I/O interface circuits/devices, as desired.

The bus 24 may be a split transaction bus, in one embodiment. The bus 24 may employ a distributed arbitration scheme, in one embodiment. In one embodiment, the bus 24 may be pipelined. The bus 24 may employ any suitable signalling technique. For example, in one embodiment, differential signalling may be used for high speed signal transmission. Other embodiments may employ any other signalling technique (e.g. TTL, CMOS, GTL, HSTL, etc.). In one implementation, the bus 24 may be defined to transfer data during one phase of the bus clock and precharge (e.g. for differential signalling) during the other phase. Thus, an agent may drive the bus responsive to one edge of the clock signal (rising or falling), and the receiving agent(s) may sampled the bus responsive to the other edge. Other embodiments may drive and sample responsive to the same edge (such as many external buses, in which a bus driver drives during the entire period of the clock and the receiving agent receives responsive to the next edge of the clock) or transfers may occur on both edges of the clock (e.g. source synchronous clocking schemes).

It is noted that the system 10 (and more particularly the processors 12A-12B, the L2 cache 14, the memory controller 16, the I/O interface circuits 22A-22I, the I/O bridges 20A-20B and the bus 24) may be integrated onto a single integrated circuit as a system on a chip configuration. In another configuration, the memory 26 may be integrated as well. Alternatively, one or more of the components may be implemented as separate integrated circuits, or all components may be separate integrated circuits, as desired. Any level of integration may be used.

It is noted that, while the illustrated embodiment employs a split transaction bus with separate arbitration for the address and data buses, other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, bus 24 may not be pipelined, if desired.

It is noted that, while FIG. 1 illustrates the I/O interface circuits 22A-22I coupled through the I/O bridges 20A-20B to the bus 24, other embodiments may include one or more I/O interface circuits directly coupled to the bus 24, if desired.

As used herein, the term transaction refers to a communication between two or more agents on an interconnect (e.g. the bus 24). An agent initiating the transaction may be the requesting agent or source, and an agent responding to the transaction is a responding agent or target. The term "memory transaction" refers to a communication between a device and the memory system. The memory transaction includes an address identifying a storage location in the memory. In the illustrated embodiment, the memory transaction is transmitted on the bus 24 to the memory controller 16 (and may be serviced by the L2 cache 14 instead of the memory controller 16). Memory transactions may include read transactions (a transfer of data from memory to the device) and write transactions (a transfer of data from the device to memory). More generally, a read transaction may be a transfer of data from a target of the transaction to the source (or initiator) of the transaction and a write transaction may be a transfer of data from a source of the transaction to the target of the transaction.

While a shared bus is used in the present embodiment, any sort of interconnect may be used in other embodiments (e.g. crossbar connections, point to point connections in a ring, star, or any other topology, meshes, cubes, etc.). Generally, an interconnect is any sort of communication medium.

Network Device

The system 10 (and specifically the system 10 integrated onto a single integrated circuit) may be optimized for use in networking devices. Specifically, the system 10 may integrate one or more processors and one or more I/O devices which are used for networking applications (e.g. routers, switches, firewalls, repeaters, concentrators, hubs, etc.). The I/O devices may include network interface circuits, and may include standard interface circuits (e.g. the PCI interface circuit 22A or the LDT interface circuit 22B). In this manner, a network device may be constructed using the system 10 and zero or more other integrated circuits. The total number of integrated circuits may be low, allowing for lower cost implementations. Furthermore, the integration of devices in system 10 may allow for lower power operation and higher performance (since the communication between the devices may occur at the higher internal clock speeds).

As used herein, the term "I/O device" refers to one or more of the following, either singly or in combination: an I/O bridge (e.g. the I/O bridges 20A-20B), an I/O interface circuit (e.g. the I/O interface circuits 22A-22I), or a peripheral component (e.g. the PCI device 28).

Figure 2:
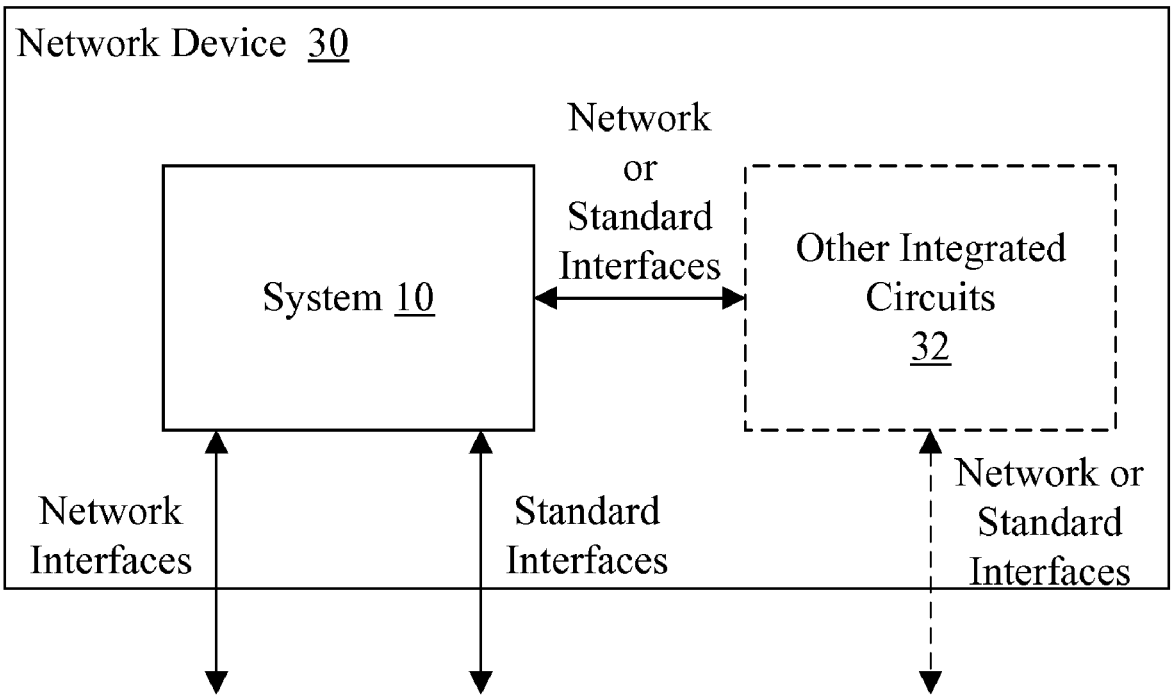
FIG. 2 is a block diagram of one embodiment of a network device employing the system shown in FIG. 1.

FIG. 2 is a block diagram of an exemplary network device 30. Other embodiments are possible and contemplated. In the embodiment of FIG. 2, the network device 30 includes the system 10 and may optionally include one or more other integrated circuits 32. The system 10 is coupled to the other integrated circuits 32 using either network interfaces or standard interfaces (e.g. PCI, LDT, serial, PCMCIA, etc.) depending on the type of integrated circuit 32.

Generally, the system 10 may provide one or more network interfaces and/or one or more standard interfaces for the network device 30, as well as providing programmability of the network device 30 through the processors 12A-12B. The other integrated circuits (if included) may provide network and/or standard interfaces for the network device 30, or may provide specific functionality for the network device 30, or both.

For example, the network device 30 may be a router. In such an embodiment, a concentrator integrated circuit may comprise the integrated circuits 32. The concentrator may be coupled to, e.g., 10 100 Mb/s Ethernet ports of the router. The concentrator may further be coupled to one of the network interface circuits 22A-22C operating at 1 Gb/s. The system 10 may process the packet, determining if the packet received on one of the Ethernet ports is to be routed to one of the other ports or one of the other network interface circuits 22A-22C (which may be operating as an uplink to a service provider or may be coupled to another router similar to the network device 30) and may transmit the packet appropriately.

As another example, the network device 30 may be a firewall. The system 10 may supply the uplink network interface and the interface to the network protected by the firewall via network interfaces 22A-22C, and may execute software to provide the firewall protection. Optionally, an encryption/decryption engine may be included as integrated circuit 30 (e.g. coupled to the PCI bus or the LDT interface).

Any type of network device 30 may be designed using one or more integrated system 10 chips and zero or more integrated circuits 32.

Coherency Within the System

Generally, coherency refers to the property that a read by a device of a given memory location results in the device receiving the most recent modification of the memory location, regardless of whether that modification is stored in the memory or is cached, and regardless of where that modification is cached. Without coherency, the software executing on the various network devices generally must ensure that data written by one agent is read by another agent in a manner that leads to error-free execution. Unfortunately, such software mechanisms may be complex and error-prone (especially if weak memory ordering is used). Additionally, the transfer of data from one agent to another may be slow (usually involving some sore of software handoff mechanism, e.g. a semaphore), and thus the performance of the network device may be limited.

Generally, coherency is provided for a given transaction by checking any cache locations that may be storing the data operated on by the transaction. This checking is often referred to as snooping. Typically, coherency is maintained on a cache block granularity, and thus the remaining discussion will refer to cache blocks. However, coherency may be maintained on any granularity.

In some systems, such as the embodiment of the system 10 shown in FIG. 1, the address of the transaction may be captured by coherent agents from the interconnect as the transaction is generated. In other systems, the transaction may be transmitted to a coherency controller, which generates probes and transmits them to the other coherent agents in the system. Either method may be used. In either case, the coherent agents may provide coherency responses which, when taken together, result in a coherent outcome of the transaction. If the transaction is a read, the most recent modification of the cache block is provided to the requesting agent. If the transaction is a write (or an invalidate so that the request agent may write the cache block), non-modified copies of the cache block are no longer used (e.g. they may be invalidated). In some systems, the coherency responses may include a retry response in which the transaction is cancelled and reattempted later. In the interim, the coherent agent which provided the retry response may take corrective action (e.g. storing a modified cache block to memory). Other systems, such as the embodiment shown in FIG. 1, may implement a protocol in which the modified cache block is provided by the coherent agent storing the modified cache block to the requesting agent. In one specific implementation, the coherent agent provides any cache block to which it has exclusive access, regardless of whether or not the block is modified.

In addition to the response provided on the interconnect for the transaction, the coherent agents may modify a coherency state maintained for the cache block to ensure that subsequent accesses to the cache block remain coherent. For example, the Modified, Exclusive, Shared, Invalid (MESI) and similar MOESI (which includes an Owned state) coherency protocols are popular. In the MESI protocol, if a read transaction has occurred, the coherent agent which was caching the cache block before the transaction occurred may change the state of the cache block to shared, thus noting that another cached copy of the cache block may exist. A subsequent read by the agent may use the cached copy, but a subsequent write by the agent may perform a transaction to invalidate the other cached copies. If a write transaction has occurred, cached copies are invalidated with the MESI protocol. Based on the responses provided by the coherent agents, the requesting agent may determine the correct coherency state for caching the cache block.

The response to a transaction may be delayed from the beginning of the transaction (referred to as the response latency) to allow time for the coherent agents to perform the appropriate checks/state changes (referred to as snooping). Thus, during the response latency for a given transaction, the state of the cache block affected by the transaction is uncertain. Complications in the coherency mechanism may arise due to the uncertainty during the response latency time period.

Figure 3:
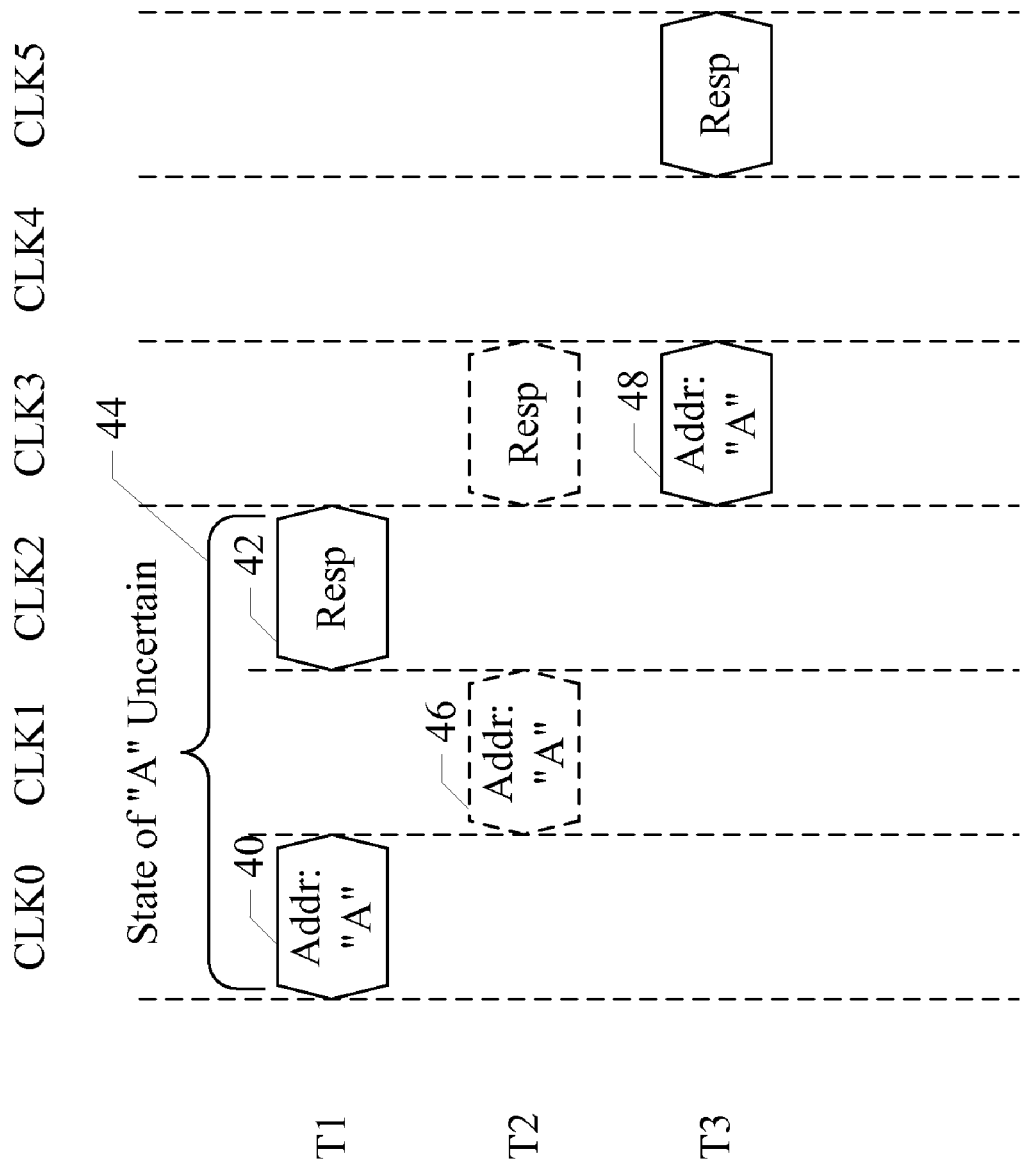
FIG. 3 is a timing diagram illustrating one embodiment of coherent transactions for the system shown in FIG. 1.

FIG. 3 is a timing diagram which illustrates the above mentioned uncertainty. Clock cycles are shown in FIG. 3 delimited by vertical dashed lines and labeled at the top (CLK0, CLK1, etc.). Transactions are labeled on the left side of the timing diagram (T1, T2, and T3).

An agent initiates the transaction T1 (to an address "A") by driving the address phase during the clock cycle CLK0 (reference numeral 40). In this example, the response phase of the transaction (when the coherency response is provided) is two clock cycles after the address phase, at clock cycle CLK2 (reference numeral 42). Thus, the coherency state of the cache block addressed by address "A" is uncertain from clock cycle CLK0 to clock cycle CLK2 (illustrated by the brace 44). Accordingly, if a transaction T2 is initiated during clock cycle CLK1 (reference numeral 46), the coherent agents may check not only their caches to determine the coherency response, but also any change to the coherency state of the cache block which may be pending from the transaction T1. On the other hand, for a transaction initiated after the uncertainty period (e.g. the transaction T3, initiated in clock cycle CLK3, reference numeral 48), the coherent agents need only check their caches since no coherency state changes are pending.

If the response latency is lengthened, the number of potentially pending state changes and thus the complexity of the coherency mechanism increases. On the other hand, if the response latency is shortened, the complexity of the coherency mechanism decreases. For example, in one embodiment, agents in the system 10 may not initiate transactions during the uncertainty period to the same cache block. If the response latency were long, such a mechanism may itself be complex and may also create performance issues. Even in embodiments in which transactions are initiated during the uncertainty period to the same cache block (e.g. T2 in FIG. 3), the complexity may be manageable if the response latency is minimized.

The system 10 implements coherency, but limits the coherency to the boundaries of the integrated circuit comprising system 10. Since system 10 is integrated, the circuitry within system 10 may be checked for cached data rapidly, such as within a couple of clock cycles of the clock signal clocking the system 10 (thus allowing a low response latency of, e.g., two bus clock cycles). Particularly, I/O devices which may cache data within the system 10 are checked and coherency is maintained with respect to those cached copies. However, coherency is not maintained for devices external to the system 10 integrated circuit. For example, the PCI device 28 shown in FIG. 1 is not maintained coherently. If the PCI device 28 caches data, the coherency of that data may be the responsibility of software. Limiting the coherency to the system 10 may eliminate the delay of accessing external devices (which may be operating slower and/or the external interfaces themselves may be higher latency interfaces than that available within the system 10). In this manner, a short response latency may be realized.

The response phase of the transaction may be defined to include any set of signals. In one implementation, each coherent agent provides a shared signal and an exclusive signal (and each agents signal's are separate from the signals of the other agents). If the agent has a shared copy of the cache block addressed by the transaction, the agent asserts the shared signal. If the agent has exclusive access to the cache block addressed by the transaction, the agent asserts the exclusive signal. "Exclusive access" includes the modified state, in which the agent has modified the cache block and thus there are no other cached copies in the system, as well as exclusive states in which the cache block is not modified but no other cached copies exist in the system. The agent, if exclusive is signalled, provides the data for the transaction. Otherwise, the memory system (the L2 cache 14 or the memory controller 16) provides the data. If the agent provides the data, it also indicates, with a signal during the data phase of the transaction, whether or not the data is modified. The requesting agent may combine the individual shared and exclusive responses to determine the response for the transaction. While separate signals are provided in the present embodiment, other embodiments may employ shared signals driven by all of the agents. Furthermore, any set of response signals may be used.

Generally speaking, the response phase of the transaction is the point at which coherency changes are defined to have been made and thus, if ownership of the cache block changes (e.g. in response to a read exclusive command or an invalidate transaction), the point at which ownership transfers. Thus, the new owner becomes responsible for the cache block (i.e. responsible for ensuring coherent transfer of the data to the next requester, if such a request occurs, or responsible for ensuring any modification are written to memory, if no such request occurs and the owner discards the cache block).

The coherent agents in the system 10 may include the processors 12A-12B (which may include L1 caches), the L2 cache 14, and the memory controller 16. Additionally, in one implementation described below, the I/O bridges 20A-20B may be coherent agents. Still further, any of the interface circuits 22A-22I may be coherent agents, in other implementations. Any integrated peripheral devices may be coherent agents, in other implementations.

FIGS. 4-7 illustrate an I/O device which caches data in one embodiment of the system 10. Specifically, each of the I/O bridges 20A-20B may cache data temporarily if an I/O interface 22A-22I coupled to that I/O bridge 20A-20B performs a write to a cache block but only updates a portion of the cache block with the write (i.e. at least one byte within the cache block is not updated). The I/O bridge 20A-20B may perform a read of the cache block, update the cache block with the write data, and write cache block back to memory (referred to as a read-modify-write operation). Thus, the I/O bridge 20A-20B caches data between the read transaction and the write transaction of the read-modify-write operation.

Figure 4:
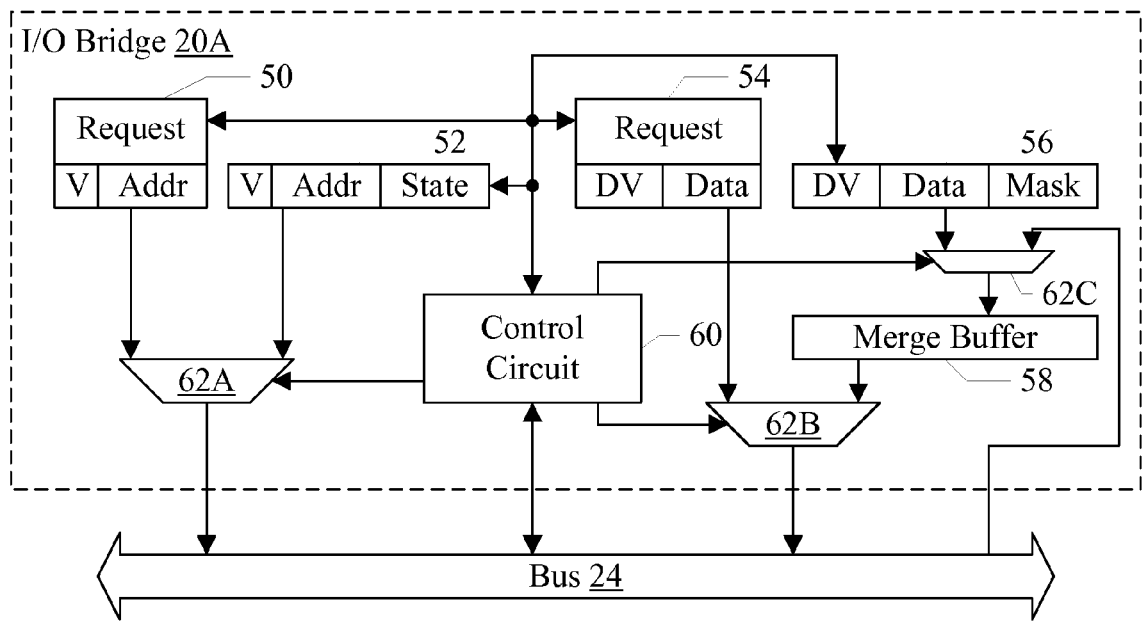
FIG. 4 is a block diagram of one embodiment of an I/O bridge shown in FIG. 1.

Turning now to FIG. 4, a block diagram of one embodiment of the I/O bridge 20A is shown. The I/O bridge 20B may be configured similarly. Other embodiments are possible and contemplated. In the embodiment of FIG. 4, the I/O bridge 20A includes a request queue 50, a read-modify-write queue 52, a request data queue 54, a read-modify-write data queue 56, a merge buffer 58, a control circuit 60, and a set of muxes 62A-62C. The request queue 50 and the read-modify-write queue 52 are coupled to the mux 62A, which is coupled to provide address phase information on the bus 24. The request data queue 54 and the merge buffer 58 are coupled to the mux 62B, which is coupled to provide data phase information on the bus 24. The merge buffer is further coupled to the mux 62C, which is coupled to receive data from the bus 24 and data from the read-modify-write data queue 56. The control circuit 60 is coupled to provide selection controls to the muxes 62A-62C and is coupled to each of the queues 50, 52, 54, and 56. Additionally, the control circuit 60 may be coupled to the bus 24. There may generally be buffers coupled between the muxes 62A-62C and the bus 24 and between the control circuit 60 and the bus 24 for receiving/driving information on the bus 24 (not shown).

The I/O bridge 20A queues transaction requests from the I/O interface circuits/peripherals coupled thereto for cache blocks (either reads or writes) in the request queue 50 (and the data for writes in the request data queue 54). The I/O bridge 20A may treat any read transaction as a cache block read, and write transactions which update the entire cache block may be queued in the request queue 50 (and the data in the request data queue 54). The reads may be performed as coherent reads on the bus 24 (causing cached copies in the other coherent agents to change to shared state and receiving the most up to date copy of the cache block addressed by the read). The writes may be performed as coherent write invalidates on the bus 24 (causing cached copies in the other coherent agents to change to invalid state and thus subsequent reads by the coherent agent read the updated data from the memory). Thus, the block reads and writes may be performed coherently.

Generally, entries in the request queue 50 may include a valid bit (V) indicating whether or not a request is queued and the address of the transaction. Additional information may be queued as desired, such as the type (read/write). Additionally, other information transmitted during the address phase may be queued, such as cacheability attributes, a tag for implementations in which the address and data phases are tagged, the command to be performed, etc. Alternatively, other address phase information may be generated when the request is selected for transmission on the bus 24. Entries in the request data queue 54 similarly include the data and a data valid bit (DV). Other information transmitted during the data phase may be queued, such as a data tag for tag implementations, an error code, etc. Alternatively, other data phase information may be generated when the request is selected for transmission on the bus 24.

On the other hand, a write request which updates only a portion of a cache block is queued in the read-modify-write queue 52 and the read-modify-write data queue 56. In response to such requests, the I/O bridge 20A performs a read transaction on the bus 24 to read the cache block in an exclusive state (a read exclusive transaction), modifies the cache block with the write data corresponding to the write transaction, and writes the modified cache block back to memory. Thus, during the time between the read and the write of the read-modify-write operation, the I/O bridge 20A is caching the cache block (in a modified state). The I/O bridge 20A enforces coherency for the cache block during this time period.

Generally, the control circuit 60 may include arbitration logic to arbitrate for the address bus and data bus included in bus 24 (or the arbitration logic may be a separate circuit, as desired). If one or more transaction requests are queued in the request queue 50 and the read-modify-write queue 54, the control circuit 60 may arbitrate for the address bus. The control circuit 60 may select a transaction request from one of the queues 50 and 52 for transmission as a transaction. The oldest outstanding transaction request may be selected, or transactions may be prioritized by type, source, etc. The control circuit 60 provides a selection control to the mux 62A dependent on which of the request queues 50 and 52 is storing the transaction selected for transmission.

If one or more data transfers (for writes) are pending in the request data queue 54 or the merge buffer 58, the control circuit 60 may arbitrate for the data bus. A data transfer is pending if the address phase of the corresponding transaction has been performed successfully on the address bus or, as will be described in more detail below, a snoop hit on the cache block stored in the merge buffer 58 is detected. The control circuit 60 may select data for transfer from one of the request data queue 54 and the merge buffer 58 for transmission on the data bus. The oldest outstanding (by order on the address bus) transaction may be selected, or transactions may be prioritized by type, source, etc. The control circuit 60 provides a selection control to the mux 62B dependent on which of the request data queue 54 and the merge buffer 58 is storing the selected data.

The read-modify-write operation will now be described in more detail. The read-modify-write queue 52 may store a valid bit (V) and the address of the transaction, similar to the request queue 50. Additionally, the read-modify-write queue 52 may include a state field ("State" in the read-modify-write queue 52 in FIG. 4). The state field may be used to track the progress of the read-modify-write operation (including a snoop hit that may occur on the cache block between the read and the write transaction). A diagram of one embodiment of the states which may occur and the operation thereof is shown below as FIG. 5. The read-modify-write data queue 56 may include a data valid bit (DV), a data field, and a mask field ("Mask" in the read-modify-write data queue 56 in FIG. 4). The mask field may store a mask which indicates which bytes within the data field are valid (e.g. which bytes within the cache block are modified by the write which caused the read-modify-write operation).

The control circuit 60 selects the read-modify-write operation and, in response to winning arbitration for the address bus on the bus 24, drives the address phase of a read exclusive transaction. Once the response phase of the read exclusive transaction completes, the I/O bridge 20A has exclusive access to the cache block. Specifically, the I/O bridge 20A may treat the cache block as modified.

Subsequent to the address phase of the read transaction, the data phase may occur. The initiation of the data phase may be under control of the agent which provides the data for the read. When the data phase occurs, the control circuit 60 may cause the data to be merged with the data from the read-modify-write data queue 56 into the merge buffer 58 by controlling mux 62C. Specifically, the control circuit 60 may use the mask to select which bytes are read from the data field in the read-modify-write data queue 56 into the merge buffer 58. The remaining bytes of the merge buffer 58 may be updated within the bytes provided in response to the read transaction on the bus 24. The mux 62C may thus be controllable, on a byte by byte basis, to select either data from the read-modify-write data queue 56 or the data provided from the bus. For example, the mux 62C may comprise a set of byte muxes, each receiving respective bytes within the cache block from the read-modify-write data queue 56 and the bus 24 and controlled by a respective bit from the mask. In this manner, the merge buffer 58 may store the updated cache block corresponding to the read-modify-write operation.

The control circuit 60 may arbitrate for the address bus to perform the write transaction at any time after the response phase of the read transaction occurs. In some embodiments, the control circuit 60 may delay until the read data is provided in response to the read transaction (and thus the data for the write transaction is available in the merge buffer 58). Other embodiments may arbitrate immediately to reduce the time between the read and write (and thus the time in which a snoop hit may occur on the cache block). Coherency state changes are controlled by the response phases of transactions, and thus, once the write transaction has reached the response phase, the I/O bridge 20A may no longer be responsible for the data (instead, the memory controller 16/L2 cache 14 may be responsible). In either case, however, it is possible that a snoop hit on the cache block may occur prior to the performance of the write transaction on the bus 24.

The control circuit 60 may compare the address of the read-modify-write operation to addresses of transactions snooped from the bus 24. If a match is detected (a snoop hit) during the time period between the read transaction and the write transaction, the control circuit 60 responds exclusive during the response phase of the snooped transaction. Subsequently, the control circuit 60 may supply the modified cache block from the merge buffer 58 as the data phase of the snooped transaction, if the transaction is a read. If the transaction is an invalidate, the control circuit 60 may invalidate the read-modify-write operation (e.g. reset the valid bit in the read-modify-write queue 52). If a snoop hit occurs before the write transaction of the read-modify-write operation, the I/O bridge 20A may not perform the write transaction since the cache block with the modification has been coherently passed to the requesting agent of the snooped transaction.

It is noted that, while the read-modify-write operation is queued in a separate queue from cache block sized requests, other embodiments may used a combined queue. In such embodiments, the muxes 62A-62B may be eliminated. Still further, other embodiments may have multiple request queues for different priority transaction requests, different sources of transaction requests, etc. Furthermore, while data is merged into the merge buffer 58 in the illustrated embodiment, other embodiments may merge the data in the read-modify-write queue 56, thus eliminating the merge buffer 58. In such an embodiment, the read-modify-write queue 56 may be coupled as an input to the mux 62B (or in a combined embodiment, no muxes may be present).

It is noted that any number of queue entries may be provided in either the request queue 50 and the read-modify-write queue 52. In one embodiment, the request queue 50 may comprise 2 entries (and corresponding entries in the request data queue 54) and the read-modify-write queue 52 may comprise one entry (and a corresponding entry in the read-modify-write data queue 56). If more than one read-modify-write queue entry is supplied, the read and write transactions for each entry may be intermingled, if desired, or may be performed one entry at a time.

While the I/O bridges 20A-20B are illustrated as performing read-modify-write operations in the illustrated embodiment, other embodiments may perform read-modify-write operations in the interface circuits/peripherals 22A-22I, if desired. In such embodiments, the I/O bridges may pass addresses of transactions to the interface circuits/peripherals which cache data, and may receive indications of the coherency state for response purposes. Furthermore, embodiments in which caching of one or more cache blocks is performed in an I/O bridge/interface circuit/peripheral for other purposes than a partial block write are contemplated. Coherency may be maintained for such cache blocks as well.

Figure 5:
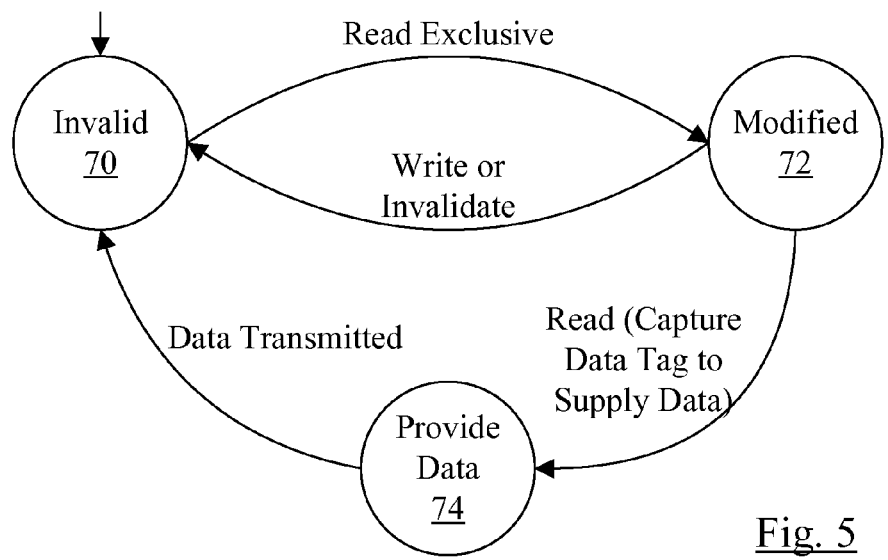
FIG. 5 is a state machine which may be employed by one embodiment of the I/O bridge shown in FIG. 4 for a read-modify-write operation.

Turning now to FIG. 5, a block diagram of a state machine which may represents the states of the state field in the read-modify-write queue 52 according to one embodiment of the I/O bridge 20A is shown. Other embodiments are possible and contemplated.

When the request is queued in the read-modify-write queue 52, the state is initialized to invalid (reference numeral 70). The valid bit (V) in the entry indicates that the entry is valid, while the state is used to determine the coherency response if a snoop hit is detected. In the invalid state 70, the control circuit 60 does not detect a snoop hit on the cache block affected by the read-modify-write operation.

The state transitions from the invalid state 70 to a modified state 72 in response to reaching the response phase of the read exclusive transaction generated by the I/O bridge 20A as the read portion of the read-modify-write operation. The response phase is the time at which ownership changes are defined to occur. Thus, the I/O bridge 20A becomes the owner of the cache block. Viewed in another way, the I/O bridge 20A becomes responsible for ensuring the coherency of the cache block with respect to the next transaction to the cache block. The I/O bridge 20A will modify the cache block supplied in response to the read exclusive transaction and will either write the modified cache block to memory using a write transaction, supply the modified cache block as the data of a read transaction to the cache block, or invalidate the cache block in response to an invalidate transaction to the cache block.

While the state is in the modified state 72, the I/O bridge 20A may arbitrate for the address bus of the bus 24 to perform the address phase of the write transaction to write the modified cache block to memory. Once the address phase has been completed, the I/O bridge 20A may arbitrate for the data bus to perform the data phase of the transaction. Alternatively, the I/O bridge 20A may arbitrate for the address bus of bus 24 while the state is in the modified state 72 and subsequent to receiving the data (and updating the merge buffer 58 with the modified data).

The state transitions from the modified state 72 to the invalid state 70 when the response phase of the write transaction of the read-modify-write operation is performed, or at the response phase of an invalidate transaction to the cache block. In the case of the write transaction being performed, ownership of the cache block is returned to the memory controller 16/L2 cache 14 at the response phase of the write transaction. The coherency of a subsequent transaction to the cache block is handled by the memory controller 16/L2 cache 14. While the state is transitioned back to invalid, the read-modify-write operation may not be deleted from the read-modify-write queue 52 until the modified cache block is transferred as data. Alternatively, the read-modify-write operation may be deleted and the merge buffer 58 may store the modified cache block until it is provided by the I/O bridge 20A on the data bus.

On the other hand, if an invalidate transaction occurs, the cache block modification is invalidated and thus the write transaction for the read-modify-write operation is not needed. The invalidate transaction may be a write-invalidate if the entire cache block is being modified by another agent, and thus no bytes from previous updates to the cache block are needed. The read-modify-write operation may be deleted from the read-modify-write queue 52 in response to the invalidate transaction.

The state transitions from the modified state 72 to a provide data state 74 in response to a read transaction to the cache block which is snooped by the I/O bridge 20A from the bus 24. The I/O bridge 20A responds to the snooped read transaction with the exclusive response, and thus is to supply the data for the read transaction. In embodiments in which a tag is used on the address bus and the data bus to link the address phase and data phase of a transaction, the I/O bridge 20A may capture the tag of the read transaction to supply the data. The captured tag may be stored in the merge buffer 58, the read-modify-write queue 52, or another storage element.

While the state is in the provide data state 74 and subsequent to receiving the cache block in response to the read transaction previously performed by the I/O bridge 20A, the I/O bridge 20A may arbitrate for the data bus to supply the data for the snooped read transaction. In this manner, the modified cache block is coherently supplied to the requesting agent of the read transaction.

The I/O bridge 20A may not respond to any transactions which snoop hit the cache block while the state is in the provide data state 74. The ownership of the cache block has been passed to the requesting agent of the read transaction, and the I/O bridge 20A does not cache the data after it has been provided to the requesting agent of the read transaction. Thus, the provide data state 74 is used to supply the data to the requesting agent and, once the data has been transmitted on the data bus, the state transitions from the provide data state to the invalid state 70. The read-modify-write operation may also be deleted from the read-modify-write queue 52 in response to transmitting the data.

It is noted that, while the present description has referred to ownership transitions occurring in the responsive phase, in some implementations a given coherent agent may actually make a state change prior to the response phase, if desired.

Figure 6:
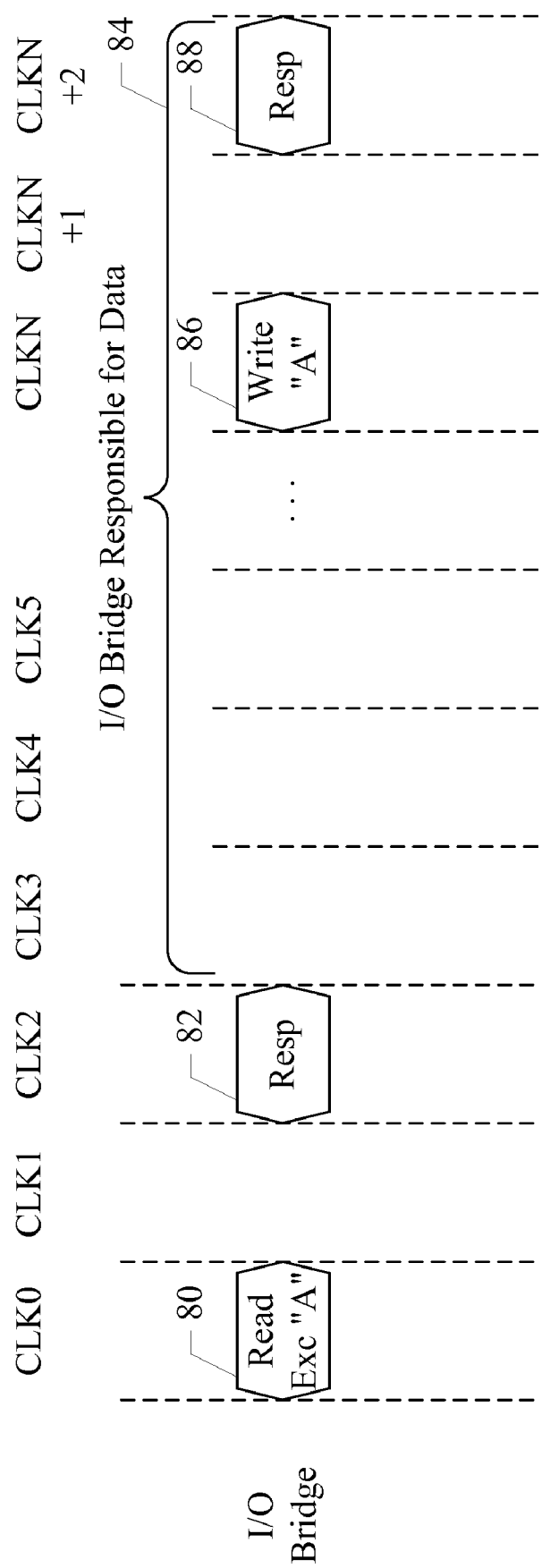
FIG. 6 is a timing diagram illustrating operation of a read-modify-write operation.

Turning now to FIG. 6, a timing diagram illustrating one embodiment of the address and response phases for a read-modify-write transaction is shown. Other embodiments are possible and contemplated. Clock cycles of the bus clock corresponding to the bus 24 are illustrated by vertical dashed lines and are labeled at the top (CLK0, CLK1 etc.). Transactions initiated by the I/O bridge are illustrated horizontally across from the label "I/O bridge" in FIG. 6.

During clock cycle CLK0, the address phase of the read portion of the read-modify-write operation is performed (reference numeral 80). Specifically, the read transaction is a read exclusive transaction to the address "A" (the cache block including the bytes updated by the partial cache block write which cause the read-modify-write operation). The response phase of the transaction occurs in clock cycle CLK2 (reference numeral 82). While the response phase is illustrated as two clocks after the corresponding address phase, other embodiments may have a shorter or longer delay between the address phase and the corresponding response phase.

Beginning in clock cycle CLK3, the I/O bridge 20A is responsible for ensuring the coherency of the cache block addressed by address "A" (brace 84). Viewed in another way, the I/O bridge 20A owns the cache block beginning in clock cycle CLK3. The I/O bridge 20A remains responsible for the coherency of the cache block until the response phase of the write transaction corresponding to the read-modify-write operation (reference numeral 88, in clock cycle CLKN+2, two clock cycles after the address phase of the write transaction, reference numeral 86, in clock cycle CLKN). The number of clock cycles between the read transaction and the write transaction may generally vary (hence the ellipses between clock cycle CLK5 and clock cycle CLKN). The number may also be less than the number shown, in some embodiments.

Figure 7:
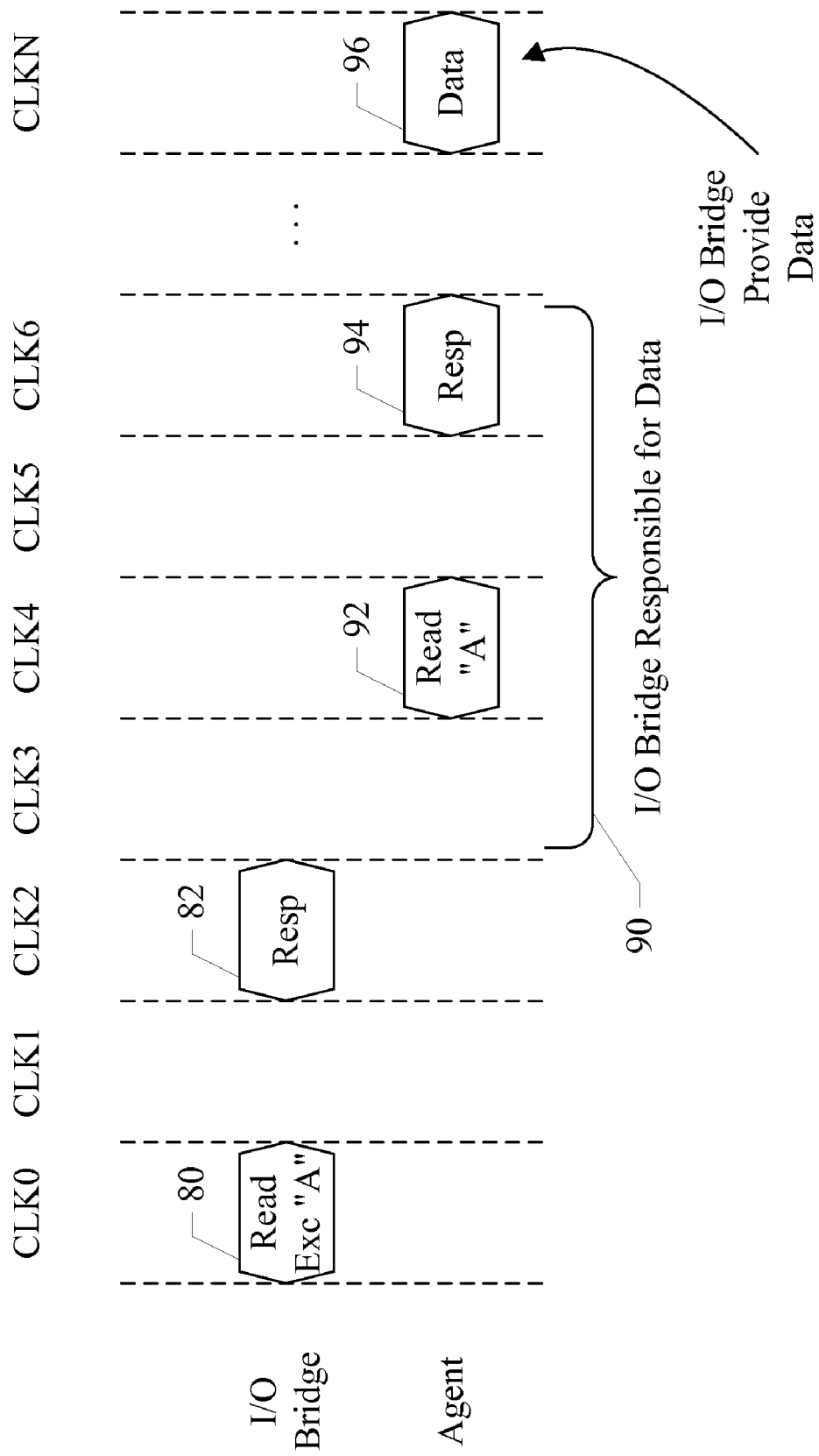
FIG. 7 is a timing diagram illustrating operation of a portion of a read-modify-write operation and a read transaction.

While FIG. 6 shows the read-modify-write operation completing with the write transaction, FIG. 7 is a timing diagram illustrating a read-modify-write operation which completes by transmitting the modified cache block to an agent which reads the cache block prior to the write transaction. Other embodiments are possible and contemplated. Clock cycles of the bus clock corresponding to the bus 24 are illustrated by vertical dashed lines and are labeled at the top (CLK0, CLK1 etc.). Transactions initiated by the I/O bridge are illustrated horizontally across from the label "I/O bridge" in FIG. 7, and transactions initiated by the agent are illustrated horizontally across from the label "Agent" in FIG. 7.

Similar to FIG. 6, the address phase of the read portion of the read-modify-write operation is performed (reference numeral 80) and the response phase of the transaction occurs in clock cycle CLK2 (reference numeral 82). Thus, the I/O bridge becomes responsible for the coherency of the cache block addressed by address "A" in clock cycle CLK3 (brace 90). However, in the example of FIG. 7, another agent initiates a read transaction to address "A". The address phase of the read transaction is illustrated in FIG. 7 in clock cycle CLK4, reference numeral 92, and the response phase is illustrated in clock cycle CLK6, reference numeral 94.

Since the I/O bridge has exclusive access to the cache block addressed by address "A", the I/O bridge responds exclusive during the response phase 94. Since the I/O bridge will not retain the modified cache block after the completion of the read transaction by the agent, the I/O bridge ceases enforcing coherency at the response stage 94. Furthermore, the I/O bridge may not perform the write transaction of the read-modify-write operation since the modified cache block has been coherently passed to another agent. In one embodiment, the memory controller 16/L2 cache 14 updates with a cache block which is transferred from one agent to another in the modified state (which is transmitted during the data phase), and thus the update is recorded in memory. Alternatively, the requesting agent may receive the data in the modified state, and thus become responsible for the coherency of the modified cache block. In yet another alternative, the I/O bridge may continue enforcing coherency for the data and may perform the write transaction to update the memory.

For the illustrated embodiment, the I/O bridge provides the data during the data phase of the read transaction generated by the agent (reference numeral 96).

Figure 8:
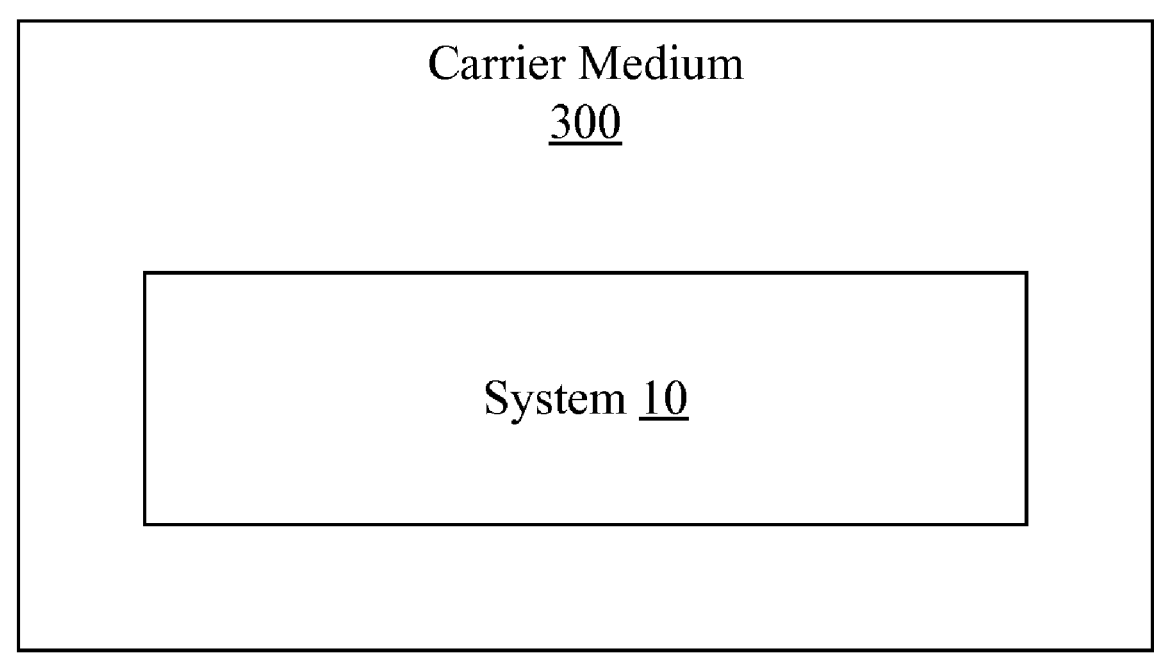

Turning next to FIG. 8, a block diagram of a carrier medium 300 including a database representative of the system 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the database of the system 10 carried on the carrier medium 300 may be a database which can be read by a program and used, directly or indirectly, to fabricate the hardware comprising the system 10. For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the system 10. The netlist may then be placed and routed to produce a data set describing geometric shapes to be applied to masks. The masks may then be used in various semiconductor fabrication steps to produce a semiconductor circuit or circuits corresponding to the system 10. Alternatively, the database on the carrier medium 300 may be the netlist (with or without the synthesis library) or the data set, as desired.

While the carrier medium 300 carries a representation of the system 10, other embodiments may carry a representation of any portion of the system 10, as desired, including any set of agents (e.g. the processors 12A-12B, the L2 cache 14, the memory controller 16, and/or the I/O bridges 20A-20B), portions of an agent, e.g. request queues, read-modify-write queues, control circuits, etc. in the I/O bridges, I/O interface circuits 22A-22I, or portions thereof, the bus 24, etc.

Numerous variations and modifications will become apparent to those skilled in the art once the above disclosure is fully appreciated. It is intended that the following claims be interpreted to embrace all such variations and modifications.

What is claimed is:

1. A network device comprising:
   a system chip to provide network and non-network interfaces for the network device, in which the system chip includes:
   (a) one or more processors coupled to an internal bus of the system chip;
   (b) a cache memory coupled to the bus to cache data for the system chip;
   (c) a plurality of interface circuits to transfer packet and non-packet data, wherein each interface circuit is to operate upon a particular mode of communication to transfer respective packet or non-packet data, in which one or more external devices are to be coupled to respective one of the interface circuits based on respective mode of communication for transfer of respective data, wherein the network and non-network interfaces of the network device are provided by the plurality of interface circuits; and
   (d) a bridge circuit coupled to the plurality of interface circuits and to the bus to transfer data between the interface circuits and the bus, the bridge circuit to maintain cache coherency for data cached in the cache memory for devices operable within the system chip, but cache coherency is not maintained by the bridge circuit for data cached in the cache memory by one or more external devices coupled to the interface circuits, wherein the one or more processors, cache memory, plurality of interface circuits and bridge circuit of the system chip are constructed on one integrated circuit chip as an integrated system on a chip; and
   at least one other integrated circuit chip coupled to the system chip to provide additional functionality for the network device in addition to the system chip.

2. The network device of claim 1 further comprising a memory controller coupled to the bus to control transfer of data between the system chip and an external memory when the external memory is coupled to the system chip.

3. The network device of claim 1, wherein one of the interface circuits is a HyperTransport compatible interface.

4. The network device of claim 1, wherein one of the interface circuits is a Peripheral Component Interconnect compatible interface.

5. The network device of claim 1, wherein one of the interface circuits is a Lightning Data Transport interface.

6. The network device of claim 1, wherein one of the interface circuits is a Media Independent Interface compatible interface or a Gigabit Media Independent Interface compatible interface.

7. The network device of claim 1, wherein one of the interface circuits is a serial interface.

8. The network device of claim 1, wherein one of the interface circuits is a Personal Computer Memory Card International Association compatible interface.

9. The network device of claim 1, wherein one of the interface circuits is a system management bus interface.

10. The network device of claim 1, wherein the network device is a router.

11. The network device of claim 1, wherein the network device is a firewall for a network.

12. The network device of claim 1, wherein the at least one other integrated circuit chip is an encryption/decryption engine for the system chip.

* * * * *